W. L. ADAMS.
ANTIBACK LASH ATTACHMENT FOR FISHING REELS.
APPLICATION FILED JUNE 1, 1920.

1,420,804.      Patented June 27, 1922.

Inventor
Walter L. Adams
By Brockett & Hyde
Attorneys

UNITED STATES PATENT OFFICE.

WALTER L. ADAMS, OF AKRON, OHIO, ASSIGNOR TO THE ENTERPRISE MANUFACTURING COMPANY, OF AKRON, OHIO, A CORPORATION OF OHIO.

ANTIBACKLASH ATTACHMENT FOR FISHING REELS.

1,420,804.   Specification of Letters Patent.   Patented June 27, 1922.

Application filed June 1, 1920. Serial No. 385,538.

*To all whom it may concern:*

Be it known that I, WALTER L. ADAMS, a citizen of the United States, residing at Akron, in the county of Summit and State of Ohio, have invented certain new and useful Improvements in Antibacklash Attachments for Fishing Reels, of which the following is a specification.

This invention relates to fishing reels and more particularly to automatic braking mechanism therefor. The invention is an improvement upon that shown, described and claimed in my prior application for fishing reels, filed November 13, 1916, Serial No. 131,058 which is now Patent No. 1,357,670, granted Nov. 2, 1920.

The object of the invention is to provide an improved fishing reel embodying a simple form of automatic braking mechanism adapted to automatically prevent back lash of the line during the casting operation, or in other words, to automatically produce a retarding effect upon the rotating spool during the casting operation and prevent it from rotating faster than the line unwinds therefrom, said braking mechanism being of simple form adapted for application to any reel and so constructed as to operate automatically without attention by the operator and without interfering with any other usual reel operation.

A further object of the invention is to provide an anti-back lash device of this kind capable of adjustment for varying effects but which is so arranged as to prevent its sticking in an inoperative position, thereby insuring effectiveness at all times.

Further objects of the invention are in part obvious and in part will appear more in detail hereinafter.

The invention comprises the construction and arrangement of parts hereinafter described and claimed.

Figure 1:
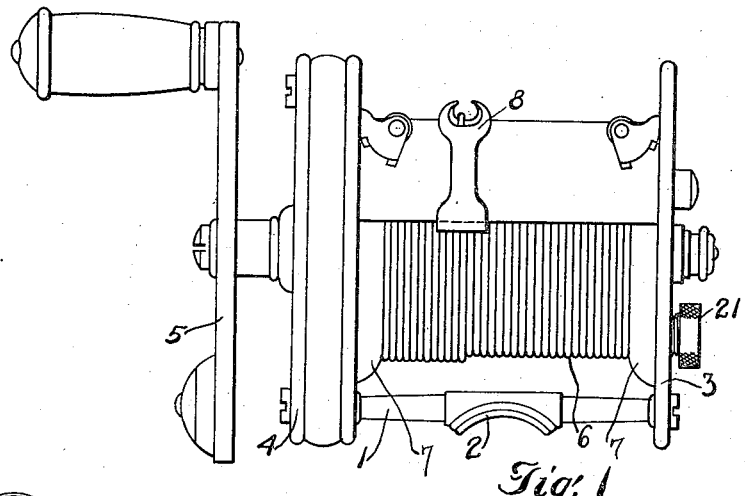
Figure 2:
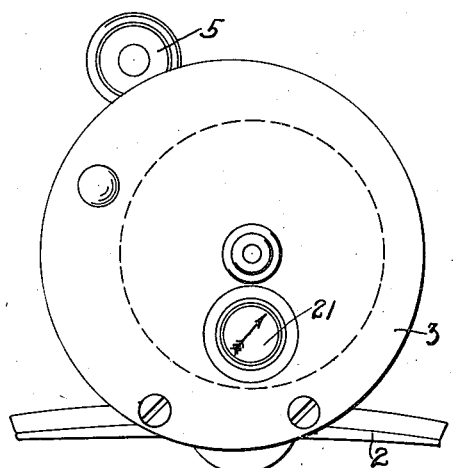
Figure 3:
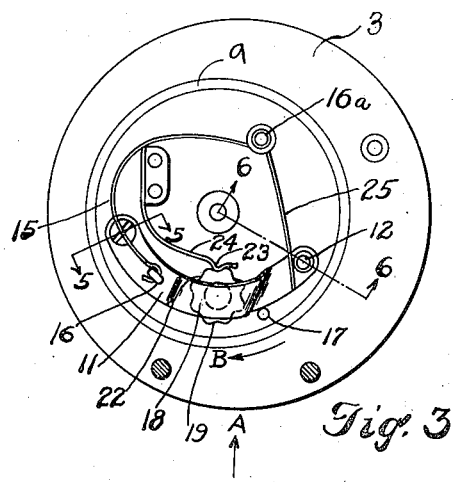
Figure 5:
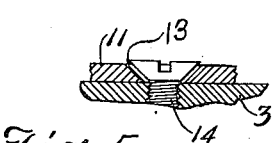
Figure 4:
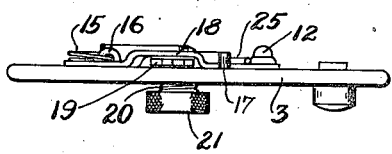
Figure 6:
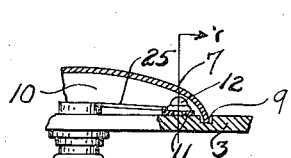
Figure 7:
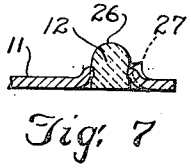

Referring to the drawings, which represent one suitable embodiment of the invention, Fig. 1 is a front view of the complete reel; Fig. 2 is an end view from the right in Fig. 1; Fig. 3 is an elevation of the inner face of the end head of the reel, with the braking parts secured thereto; Fig. 4 is an edge view thereof, looking in the direction of the arrow A, Fig. 3; Fig. 5 is a detail cross section on the line 5—5, Fig. 3; Fig. 6 is a detail section on the line 6—6, Fig. 3; showing the spool head; and Fig. 7 is an enlarged section on the line 7—7, Fig. 6.

In the drawings, 1 indicates the reel frame provided with the usual base plate 2 for attachment to the fishing rod. Said frame includes end heads 3, 4, the latter one of which encloses the usual operating mechanism (not shown), actuated by the handle 5 for driving the spool 6, provided with end heads 7 of concave form toward the ends of the reel. 8 represents level wind mechanism of any suitable form. The outer edge of one of the spool heads 7 travels in an annular groove 9 on the inner face of the end frame head 3, thereby forming a cavity or chamber 10 between said end frame head and the adjacent spool head. In said cavity is the anti-back lash or brake member 11, shown as a curved metal arm provided on one end with a friction device, such as a button 12, said button extending toward the concave surface of the spool head. The brake member is mounted to swing loosely in the cavity 10 and to also have a loose wabbling motion longitudinally of the spool axis in said cavity. For this purpose it is provided at its end opposite the button 12 with an opening 13 to receive a pivot screw 14 threaded into the head 3. This opening 13 is larger than the shank and head of the screw, as shown in Fig. 5, so that the brake member is loosely mounted as before described. Its outer or button carrying end is constantly yieldingly urged radially outwardly by a bent wire spring 15, one end of which is passed through an eye 16 on the member 11 and a portion of said wire spring is fixedly secured beneath the head of a screw 16ª threaded into the head 3. The outward motion of said brake member is limited by engagement of its edge with a fixed stop such as a pin 17.

The brake member is capable of adjustment to move its button end longitudinally of the reel or toward and from the adjacent surface of the spool head. For this purpose the middle portion of the brake member is bent at 18 over a head 19 on the inner end of a screw 20 threaded through an opening in the end plate 3 and having an operating head 21 on its exposed outer end. By screwing this screw in or out the braking member may be readily adjusted. The screw is held in any position to which it may be adjusted in any suitable manner, such as by providing its inner head 19 with a series of alternating teeth and recesses 22 to be engaged by a bent portion 23 of a leaf spring 24 secured to the head 3.

When unscrewing the screw 20 the braking member would not ordinarily follow the head 19 which it overlies, because the pressure of spring 15 at the eye 16 would cause it to stick against the pin 17. To avoid this effect a free end portion 25 of the spring 15 is preferably extended over the braking member, as shown in Fig. 3, and exerts a light tendency to hold the same down toward the head 19.

In operation the braking member is adjusted by turning the screw 20 to produce an increased or diminished braking effect as desired. When the spool is being rotated in a direction to wind in the line, said spool rotates in the direction of the arrow B, Fig. 3, and its dragging effect upon the button 12 tends to swing the arm 11 inwardly against the force of spring 15 or toward the center of the reel. Therefore when winding in the line there is a tendency to decrease the braking effect. However, when the spool rotates in the opposite direction, during unwinding motion of the line or upon a cast the effect of the spool upon the button 12 is to tend to move it outwardly or away from the center of the reel. Consequently the button 12 travels up along the curved or concave surface of the spool head with an increasing braking effect.

It will, of course, be understood that in operation the braking member need not necessarily lie in contact with the pin 17, as the engagement of the button 12 with the spool head might prevent the arm 11 from swinging out so far. Also, the effect of the brake is not dependent upon any resiliency in the metal or the material of the arm 11, but is entirely secured by the effect of the spring 15 exerted upon the loosely mounted arm, said effect being modified by the direction of rotation of the spool as before described.

While the braking button 12 may be of any suitable form or arrangement, I prefer the one shown in Fig. 7. The braking button 12 may be made of wood, fibre or a composition or any other suitable material and is provided with a rounded braking surface 26. In attaching it to the member 11 a small round hole, slightly smaller than the braking button, is first punched in member 11, after which the edges of the openings are punched upwardly with a conical punching tool to about the position shown at 27 in dotted lines in Fig. 7. The button is then inserted into the opening and the edges of the opening pressed downwardly and inwardly to contract them upon and firmly grip the button to secure it solidly in place. This arrangement does away with screws or other attaching parts and permanently secures the button in place.

What I claim is:

1. A fishing reel, comprising a frame, a spool rotatable therein and provided with an end head having a concave outer face, a pivot member on said frame, and a brake member loosely mounted upon said pivot member to swing both parallel to and toward and from the spool head.

2. A fishing reel, comprising a frame, a spool rotatable therein and provided with an end head having a concave outer face, a pivot member on said frame, a brake member loosely mounted upon said pivot member to swing both parallel to and toward and from the spool head, and yielding means moving said brake member radially outward.

3. A fishing reel, comprising a frame, a spool rotatable therein and provided with an end head having a concave outer face, a pivot member on said frame, a brake member loosely mounted upon said pivot member to swing both parallel to and toward and from the spool head, yielding means moving said brake member radially outward, a fixed stop limiting outward movement of said member, and means yieldingly moving said member away from the spool head to cause it to slide along said stop.

4. A fishing reel, comprising a frame, a spool rotatable therein and provided with an end head having a concave outer face, a pivot member on said frame, a brake member loosely mounted upon said pivot member to swing both parallel to and toward and from the spool head, yielding means moving said brake member radially outward, a fixed stop limiting outward movement of said member, means yieldingly moving said member away from the spool head to cause it to slide along said stop, and means for positively adjusting said member toward the spool.

5. A fishing reel, comprising a frame, a spool rotatable therein and provided with an end head having a concave outer face, and a brake member loosely mounted upon said frame to engage said concave outer face, said brake member having an opening therein, a brake button lying in said opening, and the edges of said opening being pressed inwardly to grip and secure said button in place.

In testimony whereof I affix my signature.

WALTER L. ADAMS.